US012445811B2

(12) United States Patent
Mondal et al.

(10) Patent No.: US 12,445,811 B2
(45) Date of Patent: Oct. 14, 2025

(54) DATA PATH SELECTION IN MOBILE NETWORK USING USER PLANE FUNCTION PEER INFORMATION

(71) Applicant: Cisco Technology, Inc., San Jose, CA (US)

(72) Inventors: Souvik Mondal, Karnataka (IN); Sujin Kumar Anagani, Morrisville, NC (US); Sudeep Kumar Pandey, Acton, MA (US); Krishna Kishore Venkata Dubagunta, Karnataka (IN); Naveen Kumar Sampath, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 343 days.

(21) Appl. No.: 18/318,449

(22) Filed: May 16, 2023

(65) Prior Publication Data

US 2024/0388877 A1    Nov. 21, 2024

(51) Int. Cl.
*H04W 4/08* (2009.01)
*H04W 40/02* (2009.01)

(52) U.S. Cl.
CPC ............ *H04W 4/08* (2013.01); *H04W 40/02* (2013.01)

(58) Field of Classification Search
CPC ........ H04W 4/08; H04W 40/02; H04L 47/15; H04L 47/806; H04L 61/5069; H04L 67/1044; H04L 12/185
See application file for complete search history.

(56) References Cited

U.S. PATENT DOCUMENTS

| | | | |
|---|---|---|---|
| 2020/0186462 A1* | 6/2020 | D'Acunto | G06F 9/5077 |
| 2021/0058990 A1 | 2/2021 | Talebi Fard et al. | |
| 2021/0068172 A1* | 3/2021 | Jeong | H04W 76/10 |
| 2021/0075723 A1* | 3/2021 | Sun | H04L 12/189 |
| 2021/0168568 A1 | 6/2021 | Dao et al. | |
| 2021/0274323 A1* | 9/2021 | Xu | H04W 4/08 |

(Continued)

FOREIGN PATENT DOCUMENTS

| | | | |
|---|---|---|---|
| WO | 2022015044 A1 | 1/2022 | |
| WO | WO-2023078970 A1 * | 5/2023 | H04W 76/32 |

OTHER PUBLICATIONS

I3GPP TS 23.501 V16.12 (3rd Generation Partnership Project; Technical Specification Group Services and System Aspects; System architecture for the 5G System (5GS); Stage 2 (Release 16)) (Year: 2022).*

(Continued)

*Primary Examiner* — Andrew W Chriss
(74) *Attorney, Agent, or Firm* — Edell, Shapiro & Finnan, LLC

(57) ABSTRACT

A method comprises: at user plane functions (UPFs) of a network, creating a multicast group of the UPFs to enable inter-UPF communication between the UPFs in a multicast domain and, by each UPF: exchanging messages with peer UPFs of the UPFs in the multicast domain to learn peer attributes of the peer UPFs; reporting the peer attributes of the peer UPFs to a session management function (SMF) of the network; and at the SMF, selecting, for a data session, particular UPFs of the UPFs to be configured into a UPF chain of a data path for traffic from user equipment to a data network, based on the peer attributes of the peer UPFs as reported by the UPFs.

20 Claims, 8 Drawing Sheets

(56) References Cited

U.S. PATENT DOCUMENTS

| | | | |
|---|---|---|---|
| 2021/0392469 A1* | 12/2021 | Wang | H04L 12/4641 |
| 2022/0232671 A1 | 7/2022 | Talebi Fard et al. | |
| 2022/0263906 A1 | 8/2022 | Dodd-Noble et al. | |
| 2024/0048398 A1* | 2/2024 | He | H04M 15/00 |
| 2025/0168106 A1* | 5/2025 | Mishra | H04L 45/04 |

OTHER PUBLICATIONS

Luglio et al (Analytics support in the 5G Core Network for data-driven management of a supplementary backhaul) (Year: 2022).*

Tran et al (Enabling Multicast and Broadcast in the 5G Core for Converged Fixed and Mobile Networks) (Year: 2020).*

"5G; Procedures for the 5G System (5GS) (3GPP Ts 23.502 version 16.7.0 Release 16)," 3GPP 5G, ETSI TS 123 502 V16.7.0, Jan. 2021, 607 pages.

"5G; System architecture for the 5G System (5GS) (3GPP TS 23.501 version 16.6.0 Release 16)," ETSI TS 123 501 V16.6.0, Oct. 2020, 450 pages.

* cited by examiner

DATA PATH SELECTION IN MOBILE NETWORK USING USER PLANE FUNCTION PEER INFORMATION

TECHNICAL FIELD

The present disclosure relates generally to data plane path selection in a network.

BACKGROUND

User plane function (UPF) chaining may be implemented in a 3$^{rd}$ Generation Partnership Project (3GPP) 5$^{th}$ Generation (5G) network (referred to simply as a "5G network"). The intent of UPF chaining is to provide appropriate data plane routes for different types of traffic generated in a common protocol data unit (PDU) session based on policy/quality of service (QoS) requirements. To implement UPF chaining, a session management function (SMF) may select an uplink classifier (UL/CL) or branching point (BP) (UL/CL-BP) UPF (i.e., a UPF that has a UPF chaining capability as an UL/CL or a BP) and a PDU session anchor (PSA) UPF (i.e., a UPF that has a UPF chaining capability as a PSA) based on either (i) a static configuration and policy based selection that maps UPF capability to the UPFs, or (ii) network repository function (NRF) capability responses.

Such hardwired selection of the UPFs for UPF chaining can add additional hops in a UPF data path. Hence, the link status and latency between the UPFs become important parameters in influencing the QoS, and which may not have been considered by the SMF during UPF selection. For example, the SMF may chain together UPFs UPF1→UPF2→UPF3 for a PDU session but there may be a huge link latency between UPF1 and UPF2, which is unknown to the UPFs and unknown to the SMF.

DETAILED DESCRIPTION

Overview

In an embodiment, a method comprises: at user plane functions (UPFs) of a network, creating a multicast group of the UPFs to enable inter-UPF communication between the UPFs in a multicast domain and, by each UPF: exchanging messages with peer UPFs of the UPFs in the multicast domain to learn peer attributes of the peer UPFs; reporting the peer attributes of the peer UPFs to a session management function (SMF) of the network; and at the SMF, selecting, for a data session, particular UPFs of the UPFs to be configured into a UPF chain of a data path for traffic from user equipment to a data network, based on the peer attributes of the peer UPFs as reported by the UPFs.

EXAMPLE EMBODIMENTS

The following is a glossary of terms that may be used in the ensuing description:
AMF—access and mobility management function.
AUSF—authentication server function
DN—data network.
NEF—network exposure function.
NRF—network repository function.
NSSF—network slice selection function.
PCF—policy control function.
PDU—protocol data unit.
UPF—user plane function.
RAN—radio access network.
SMF—session management function.
UE—user equipment.
UDF—unified data management function.
UPF—user plane function.

Figure 1:
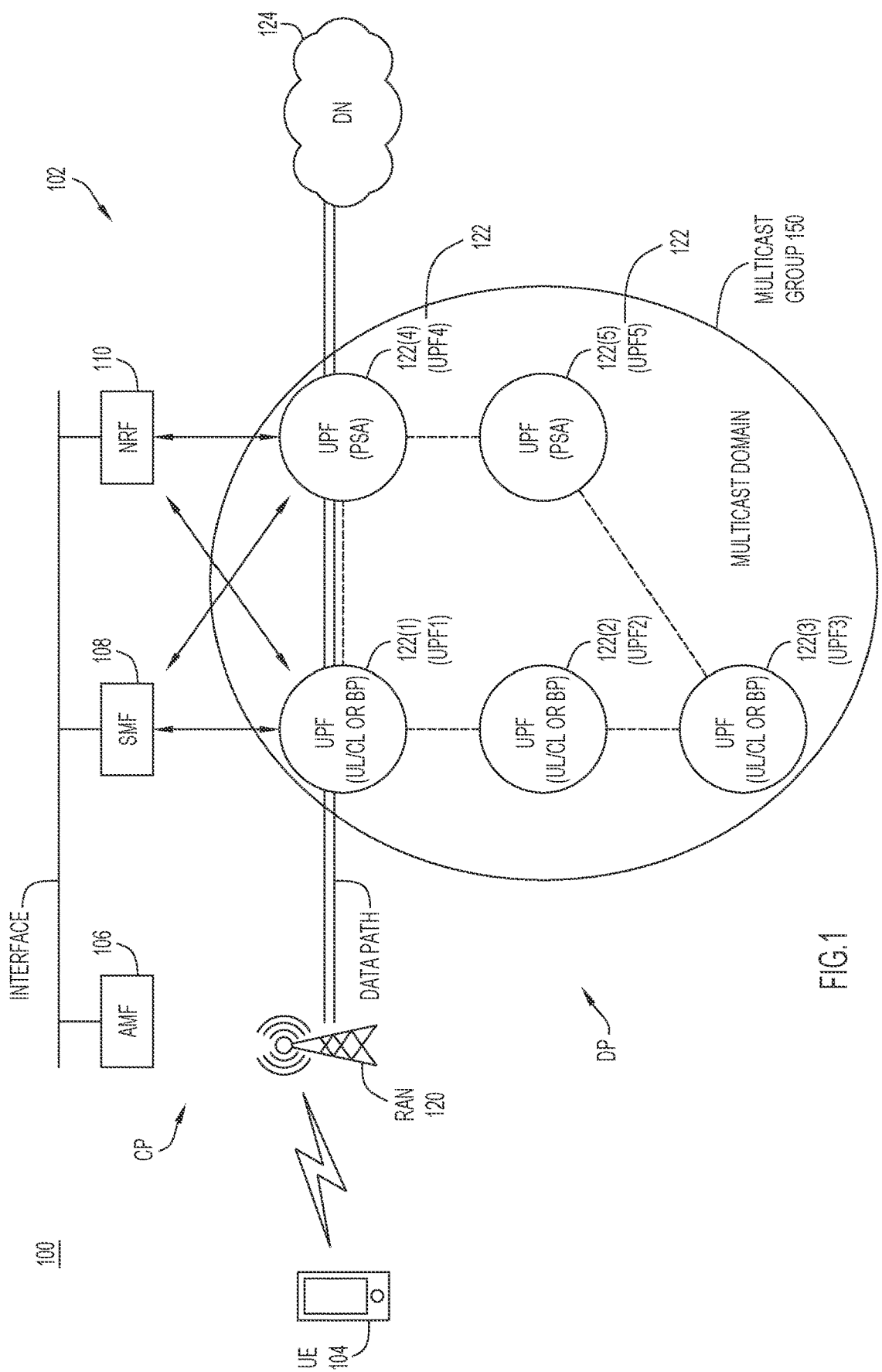
FIG. 1 is a block diagram of a network environment in which embodiments directed to UPF chaining based on information exchanged between peer UPFs of a multicast group may be implemented, according to an example embodiment.

FIG. 1 is a block diagram of an example network environment 100 in which embodiments directed UPF chaining based on UPF peer information exchanged between peer UPFs of a multicast group, may be implemented. The embodiments provide a method to setup an optimal UPF chaining data path by selecting particular UPFs based on the UPF peer information. The propagation of the peer UPF information is facilitated through UPF-to-UPF communication over a multicast domain, as described below.

Network environment 100 includes a network 102 configured to communicate with UE 104. In an example, network 102 is a 5G network that includes a control plane CP and a data plane DP. Control plane CP comprises network functions, including an AMF 106, an SMF 108, and an NRF 110 that communicate with each other over various signaling interfaces. Control plane CP typically includes additional network functions, such as an AUSF, NEF, NSSF. PCF, and UDF, not shown. Data plane DP includes a RAN 120 to communicate with UE 104 over an air interface, UPFs 122(1)-122(5)(also respectively designated as UPF1-UPF5 and collectively referred to as "UPFs 122"), and a data network 124 configured to communicate with each other. For example, UPFs 122 may communicate with SMF 108 over N4 interfaces using a packet forwarding control protocol (PFCP) provided in the 3GPP specifications, but modified or extended according to embodiments presented herein. In an example, the network functions of control plane CP and data plane DP may comprise executable applications hosted on one or more computing devices, such as servers or the like, which include one or more processors to execute control logic of the applications to perform the operations described herein.

UE 104 establishes PDU sessions with data network 124 through RAN 120 and UPFs 122, under control of control plane CP. For example, when UE 104 attaches/connects to network 102, SMF 108 configures one or more of UPFs 122 into a data path to forward UE traffic from RAN 120 to data network 124. As per sections 5.6.4.1 of 3GPP specification 23.501, PDU sessions which connect with session and service continuity (SSC) mode 3, or which employ selective routing, for example, rely on multiple UPFs in the data path. To satisfy such scenarios, network 102 implements "UPF chaining" in data plane DP. "UPF chaining" refers to interconnecting a "chain" of UPFs that respectively serve different UPF chaining capabilities (also referred to as "UPF chaining roles") with respect to traffic forwarded by the UPFs. To implement UPF chaining, during PDU session establishment, SMF 108 selects particular UFPs among UPFs 122 to be chained together in the data path based on preassigned/preconfigured UPF chaining capabilities of the UPFs and their positions in the UPF chain to be formed, among other factors, as we will be discussed below.

For purposes of UPF chaining, control plane CP (e.g., SMF 108 and/or NRF 110) preassign to UPFs 122 respective UPF chaining capabilities (referred to simply as "capabilities" or "roles") during a priori network provisioning. The assigned capabilities include UL/CL-BP or PSA, for example. A UL/CL-BP UPF (donated "UPF (UL/CL or BP)" in FIG. 1) classifies "uplink" traffic originated by UE 104 during a PDU session and acts as a branching point to direct the classified traffic to a PSA UPF, which acts as an anchor for the PDU session. In the example of FIG. 1. UPFs 122 have the following preassigned capabilities: UPFs 122(1)-122(3) are UL/CL-BP UPFs; and UPFs 122(4) and 122(5) are PSA UPFs.

During PDU session establishment, SMF 108 may configure a data path with a UPF chain that includes at least a UL/CL-BP UPF and a PSA UPF. To do this, SMF 108 identifies/selects the UL/CL-BP UPF (e.g., UPF 122(1)) and the PSA UPF (e.g., UPF 122(4)) from UPFs 122 for the UPF chain based in part on their preassigned capabilities. SMF 108 establishes N4 tunnels to the selected UPFs, and facilitates establishment of N9 tunnels between the selected UPFs to chain the UPFs. Over the N4 tunnels, SMF 108 installs classifier rules to the UL/CL-BP UPF.

Once the PDU session is established, upon receiving uplink traffic (e.g., IP packets) from RAN 120, the UL/CL-BP UPF steers the uplink traffic to the PSA UPF based in part on the classifier rules. Upon receiving the steered uplink traffic, the PSA UPF processes the steered uplink traffic to forward the same to data network 124.

According to embodiments presented herein, UPFs 122 are configured to form/create an Internet Protocol (IP) multicast group 150 of UPFs (also referred to simply as a "multicast group") that communicate with each other (i.e., exchange information with each other) using multicast communications over a multicast domain. In multicast group 150, UPFs 122 inter-communicate as multicast peer UPFs (simply referred to as "peers") in the multicast domain. To create multicast group 150, each UPF joins the multicast group using a multicast join. Once joined, each UPF exchanges multicast messages with each peer in multicast group 150 to learn attributes (referred to as "peer attributes") of each peer. Peer attributes include, but are not limited to, indications of a UPF chaining capability (e.g., UL/CL-BP or PSA) of each peer, link status to each peer (e.g., link health and link latency), and IP chunk allocation. As used herein, the term "link" refers to an inter-UPF data path. Each UPF reports to SMF 108 the peer attributes learned through the multicast message exchange. Thus, all UPFs 122 report peer attributes to SMF 108.

SMF 108 receives from each of UPFs 122 the peer attributes. Armed with the peer attributes for UPFs 122, during PDU establishment, SMF 108 uses the peer attributes to aid in intelligent and optimal UPF selection for UPF chaining that achieves a best QoS and avoids error conditions, such as looping (described below). For example, SMF 108 may select UPFs that result in lowest latency UPF chains (i.e., UPF chains that result in a lowest overall data path latency). SMF 108 may ensure selection of UPF combinations that avoid erroneous looping. In addition, UPFs 122 are able to detect and report to SMF 108 erroneous IP chunk allocations.

UPFs 122 are preconfigured/provisioned to form the multicast group among themselves. For example, UPFs may be provisioned with host applications that implement multicast-related operations. UPFs 122 may employ any known or hereafter developed multicast technology or protocol to discover each other, and to create, maintain, and inter-communicate in multicast group 150, such as, but not limited to, the internet group management protocol (IGMP), and the like. For example, each UPF may originate an IGMP join to become a member of multicast group 150. Once joined, each UPF may send multicast messages (e.g., multicast advertisements/announcements) to peers in multicast group 150. Each multicast message may carry (i) a unique identifier (ID) of the originating UPF, (ii) a multicast address (S, G) (where S is an IP source address of the originating UPF and G is an IP multicast group address for multicast group 150), and (iii) a payload that advertises/indicates peer attributes of the originating UPF, such as its assigned UPF chaining capability and IP chunk information. In addition, each UPF may send a respective ping command to each peer to measure/compute a respective link round trip time (RTT) (i.e., a link latency) to each peer, and determine a link status (e.g., whether a link is connected/disconnected).

Figure 2A:
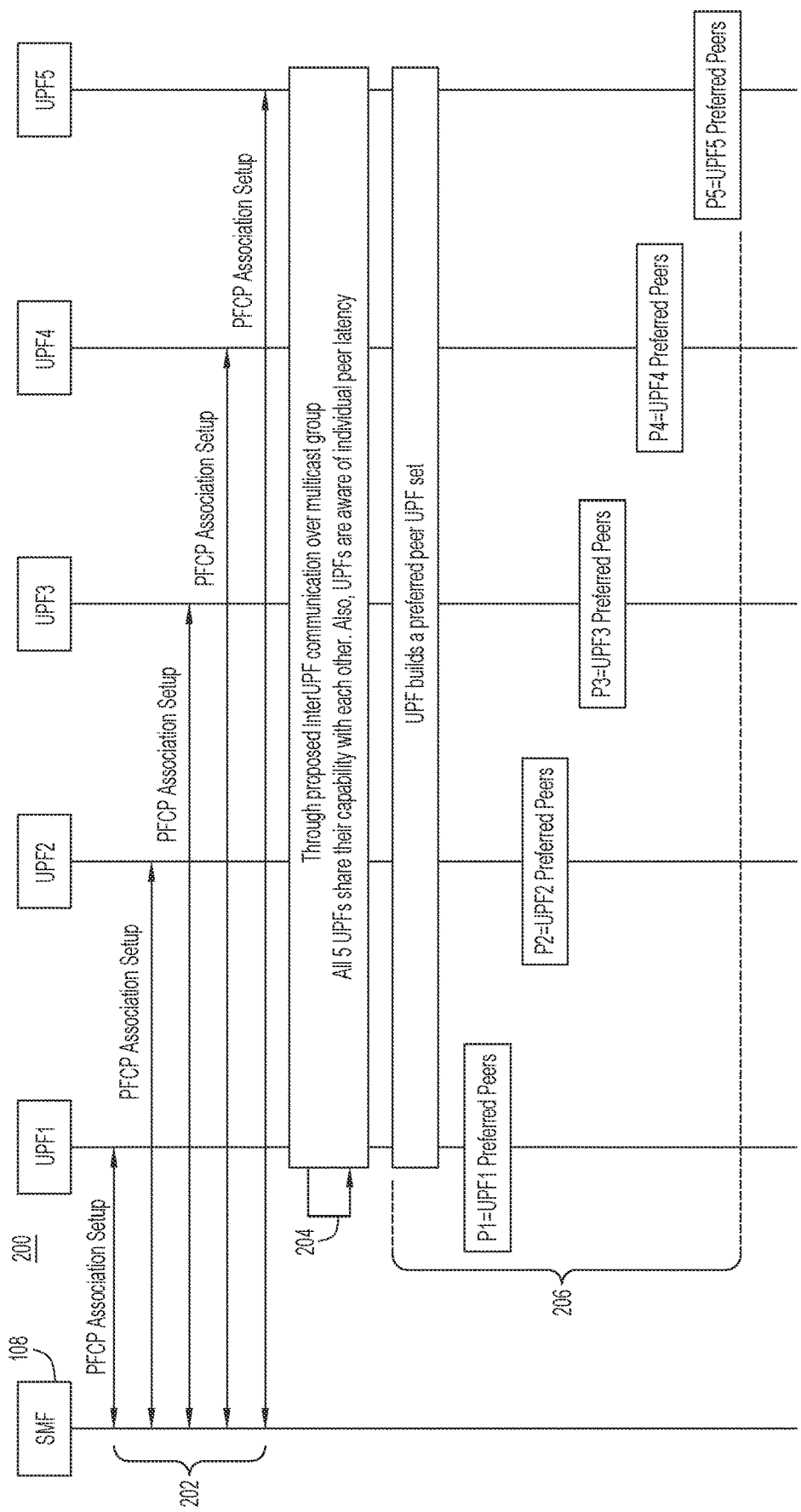
FIGS. 2A and 2B are diagrams of a call flow performed in a network of the network environment and by which the peer UPFs of the multicast group exchange and report preferred peer attributes, according to an example embodiment.
Figure 2B:
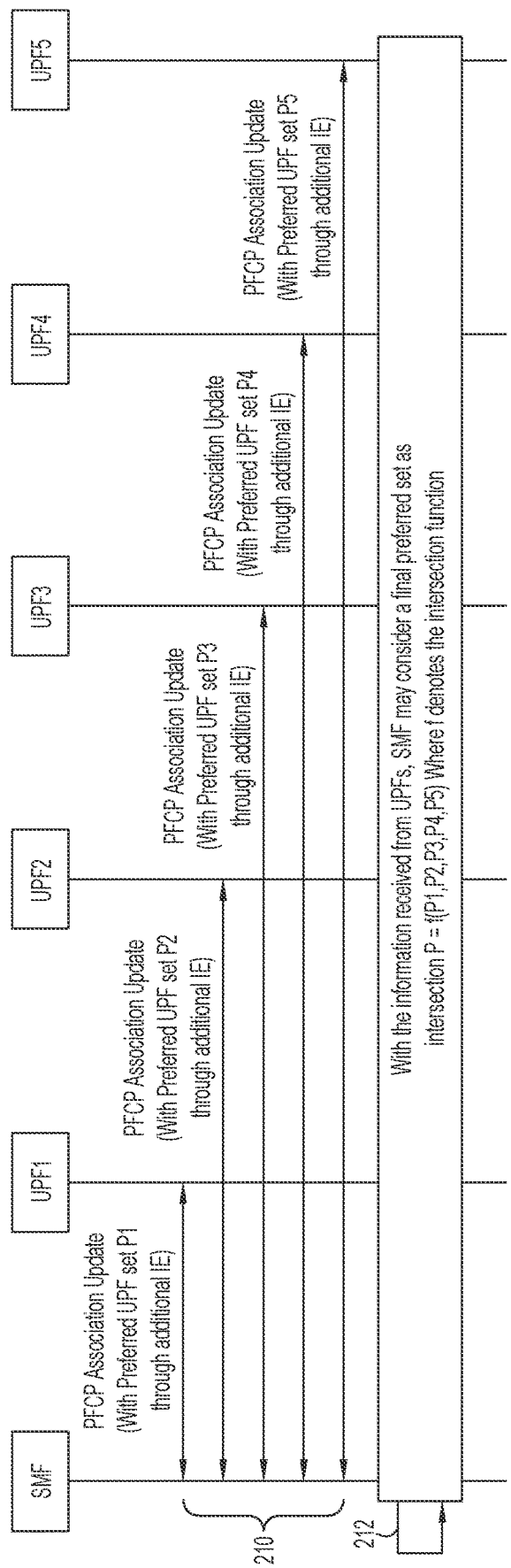

FIGS. 2A and 2B are diagrams of an example call flow 200 performed in network 102 and by which UPFs 122 of multicast group 150 generate and report to SMF 108 preferred peer attributes.

Beginning with FIG. 2A, at 202, SMF 108 establishes/sets-up respective PFCP associations with UPF1, UPF2. UPF3, UPF4, and UPF5 over N4 interfaces.

At 204, through inter-UPF communication in the multicast group/domain, each UPFi (e.g., UPF1) exchanges with each peer (e.g., each of UPF2-UPF5) messages to learn and record respective attributes (i.e., capabilities) of/associated with each peer. In a first example of multicast inter-UPF communication, each UPFi broadcasts to multicast group 150 a multicast message (S, G) that includes a UPFi ID and a payload, which advertises attributes of UPFi (i.e., UPFi attributes), including the UPFi capability (e.g., UL/CL-BP or PSA). The peers receive and record the advertised UPFi attributes. Similarly, UPFi receives from the peers multicast messages advertising their respective peer attributes, and UPFi records the same. In a second example of inter-UPF communication, each UPFi exchanges respective ping commands with each peer to learn/compute respective link latencies to each peer, and records the respective link latencies as further peer attributes. UPFi builds a preferred peer UPF set based on the peer attributes. Specifically, UPF1, UPF2, UPF3, UPF4, and UPF5 respectively build preferred peer UPF sets P1, P2, P3, P4, and P5, as shown in FIG. 2A.

At 206, upon receiving the advertised attributes (e.g., capability, link latency, and so on) from each peer, and upon computing the link latency to each peer, each UPFi builds a preferred peer UPF set that includes the peer attributes (advertised and computed) for each peer. Specifically, UPF1, UPF2, UPF3, UPF4, and UPF5 respectively build preferred peer UPF sets P1, P2, P3, P4, and P5, as shown in FIG. 2A and presented in the example tables below.

UPF1 builds Table 1 below that includes the attributes of UPF1 preferred peers:

TABLE 1

| P1 = UPF1 Preferred Peers | | |
| --- | --- | --- |
| Peer | Capability/Role | Link Latency (time T) |
| UPF2 | UL/CL-BP | T0 |
| UPF3 | UL/CL-BP | T1 |
| UPF4 | PSA | T2 |
| UPF5 | PSA | T3 (e.g., ignore UPF5 because of high latency) |

UPF2 builds Table 2 below that includes attributes of UPF2 preferred peers:

TABLE 2

| P2 = UPF2 Preferred Peers | | |
| --- | --- | --- |
| Peer | Capability/Role | Link Latency |
| UPF1 | UL/CL-BP | T4 |
| UPF3 | UL/CL-BP | T4 |
| UPF4 | PSA | T6 |
| UPF5 | PSA | T7 |

UPF3 builds Table 3 below that includes attributes of UPF3 preferred peers:

TABLE 3

| P3 = UPF3 Preferred Peers | | |
| --- | --- | --- |
| Peer | Capability/Role | Link Latency |
| UPF1 | UL/CL-BP | T8 |
| UPF2 | UL/CL-BP | T9 |
| UPF4 | PSA | T10 |
| UPF5 | PSA | T11 |

UPF4 builds Table 4 below that includes attributes of UPF4 preferred peers:

TABLE 4

| P4 = UPF4 Preferred Peers | | |
| --- | --- | --- |
| Peer | Capability/Role | Link Latency |
| UPF1 | UL/CL-BP | T12 |
| UPF2 | UL/CL-BP | T13 |
| UPF3 | UL/CL-BP | T14 |
| UPF5 | PSA | T15 |

UPF5 builds Table 5 below that includes attributes of UPF5 preferred peers:

TABLE 5

| P5 = UPF5 Preferred Peers | | |
| --- | --- | --- |
| Peer | Capability/Role | Link Latency |
| UPF1 | UL/CL-BP | T16 (e.g., ignore UPF1 because of high latency) |
| UPF2 | UL/CL-BP | T17 |
| UPF3 | UL/CL-BP | T18 |
| UPF2 | PSA | T19 |

Moving to FIG. 2B, at 210, UPF1, UPF2, UPF3, UPF4, and UPF5 send to SMF 108 respective PFCP association updates/reports that include UPF1, UPF2, UPF3, UPF4, and UPF5 preferred peers information (e.g., that report P1, P2, P3, P4, and P5). The UPF preferred peers information may be included in an information element (IE) of each PFCP association update.

At 212, SMF 108 receives from UPFs 122 their respective reports. SMF 108 may determine a final UPF preferred set P of preferred peer attributes as an intersection of P1-P5, e.g., P=f(P1, P2, P3, P4, P5), where f denotes an intersection function. In an example, set P may minimize link latency from each UPFi to its peers. Thus, set P may list for each UPFi the peer to which each UPFi has a minimum link latency.

Figure 3:
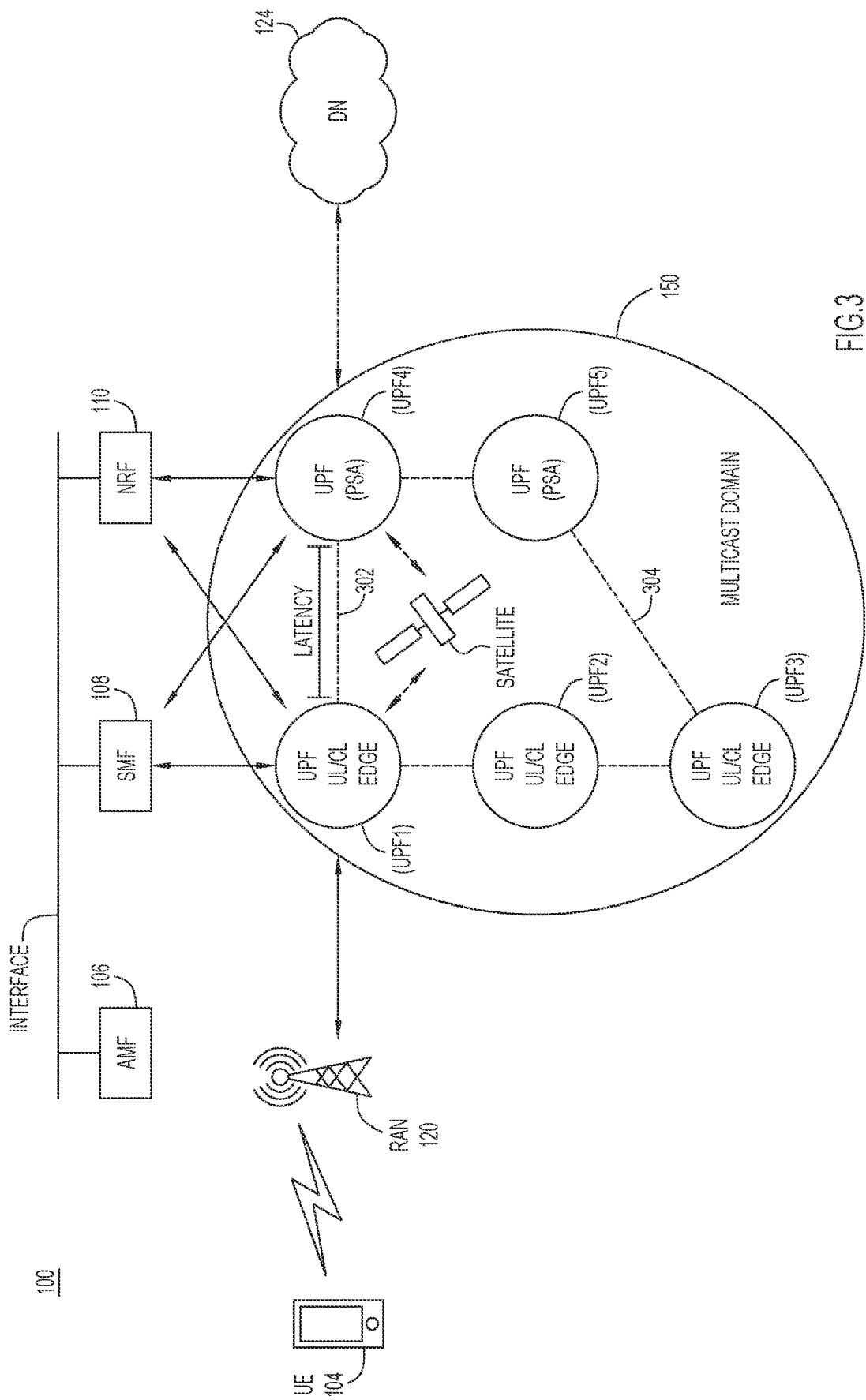
FIG. 3 is an illustration of the network that is useful for describing optimal selection of a pair of UL/CL-BP and PSA UPFs for a UPF chain that minimizes link latency, according to an example embodiment.

FIG. 3 is an illustration of network environment 100 that is useful for describing optimal selection of a pair of UL/CL-BP and PSA UPFs for a UPF chain that minimizes link latency (and thus overall data path latency), according to an embodiment. In the example of FIG. 3, each UPF UL/CL-BP (e.g., each of UPF1, UPF2, and UPF3) is referred to as a "UPF UL/CL edge." In the example of FIG. 3, UPF1 and UPF4 are widely separated geographically, and a link 302 between them includes a satellite hop that introduces a maximum link latency among all inter-UPF links in data plane DP. On the other hand, a link 304 between UPF3 and UPF5 does not include a satellite link and has a minimum link latency among the inter-UPFs links.

As described above in connection with FIGS. 2A and 2B, prior to PDU session establishment, UPF1-UPF5 inter-communicate in the multicast domain to learn link latencies between each other, and report the learned link latencies to SMF 108. Subsequently, during PDU session establishment, when SMF 108 is called upon to set-up a UPF chain in a data path for a PDU session, the SMF (i) compares the reported link latencies between pairs of UL/CL-BP and PSA UPFs against each other (e.g., between UPF1 and UPF4, between UPF1 and UPF5, between UPF2 and UPF4, between UPF2 and UPF5, between UPF3 and UPF5, and so on). Results of the compare indicate that the link latency between UPF3 and UPF5 has the minimum link latency. Thus, SMF 108 selects UPF3 and UPF5 for the UPF chain to minimize link latency, and then facilitates establishment of an N9 tunnel between the selected UPFs to form the UPF chain.

Figure 4:
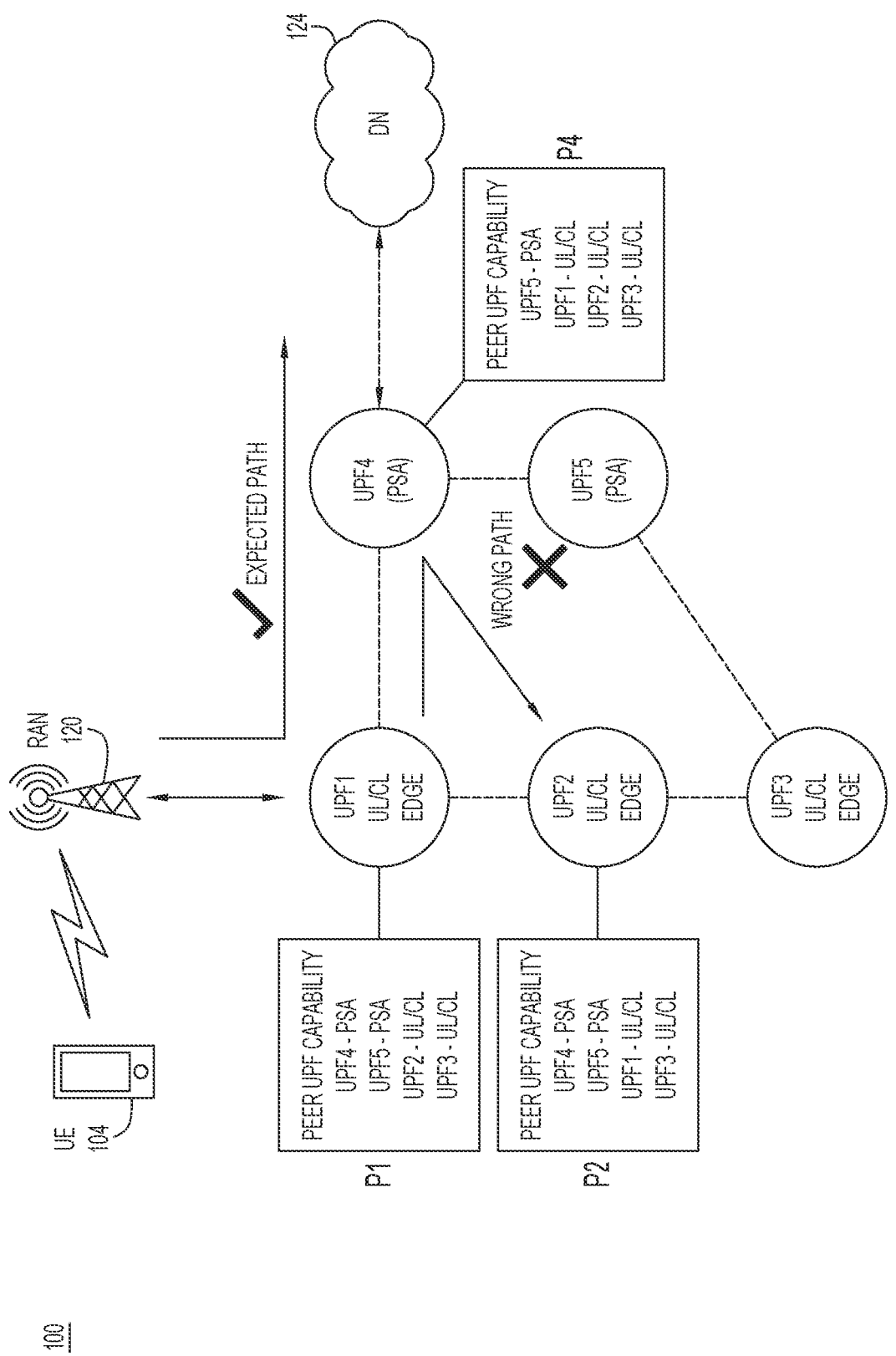
FIG. 4 is an illustration of a portion of the network that is useful for describing the selection of UL/CL-BP and PSA UPFs in order to prevent possible traffic looping conditions, according to an example embodiment.

FIG. 4 is an illustration of a portion of network 102 that is useful for describing a selection of a pair of UL/CL-BP and PSA UPFs by SMF 108 in order to prevent possible traffic looping conditions. As described above in connection with FIGS. 2A and 2B, prior to PDU session establishment, UPF1-UPF5 inter-communicate in the multicast domain to learn their peer capabilities and report the learned peer capabilities to SMF 108. Upon receiving the reports, SMF 108 constructs a current table of UPF capabilities. Subsequently, during PDU session establishment, when SMF 108 selects UPFs to fulfill a sequence of particular capabilities in a UPF chain (e.g., UL/CL-BP followed by PSA), the SMF correctly selects the UPFs based on their capabilities as currently listed in the table. In other words, SMF 108 selects for the UPF chain UPFs that have the correct roles for their positions in the UPF chain. For example, SMF 108 selects a correct sequence including UPF1 (UL/CL-BP) (first position) followed by UPF4 (PSA) (second position), but does not select an incorrect sequence including UPF1 (UL/CL-BP) followed by UPF4 (PSA) (correct) followed by UPF2 (UL/CL-BP) (incorrect) for the UPF chain. Selection of the incorrect sequence would result in black-holing of traffic (also referred to as "looping") toward UPF2.

Figure 5:
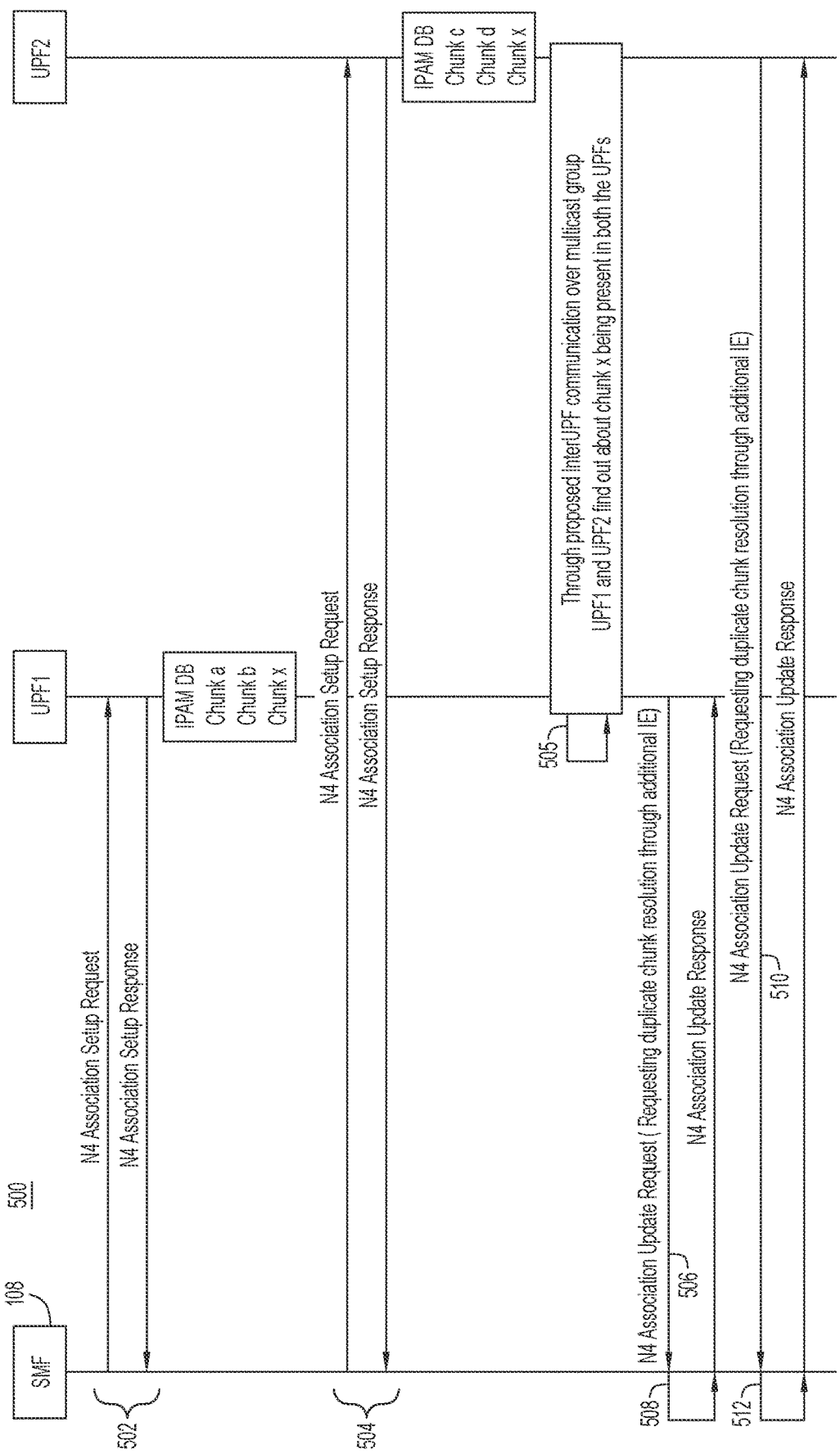
FIG. 5 is a diagram of a call flow performed in the network and by which the UPFs inter-communicate in the multicast domain to detect and resolve irregular Internet Protocol (IP) chunk configurations across the UPFs, according to an example embodiment.

FIG. 5 is a diagram of an example call flow 500 performed in network 102 and by which UPFs 122 inter-communicate in the multicast domain and communicate with SMF 108 in order to detect and resolve irregular IP chunk assignments/configurations across the UPFs. Typically, in the multi-UPF network. SMF 108 distributes distinct IP chunks among the UPFs. In practice, erroneous network events can lead to duplicate IP chunk assignments among the UPFs. In a production network, such duplicate IP chunks can cause adverse subscriber impacting scenarios. Accordingly, embodiments presented herein detect and resolve such errors, automatically, as described below by way of example.

At 502, SMF 108 and UPF1 exchange N4 association setup request and response messages by which the SMF distributes/assigns to UPF1 multiple pools of IP addresses (referred to as "IP chunks" or simply "chunks") including IP chunks a, b, and x. UPF1 stores the IP chunks locally in an IP address management (IPAM) database (DB).

At 504, SMF 108 and UPF2 exchange N4 association setup request and response messages by which the SMF distributes to UPF2 multiple IP chunks c, d, and x. UPF2 stores the IP chunks locally in an IPAM DB.

At 505, UPF1 and UPF2 inter-communicate as peers over the multicast domain to determine which IP chunks are present in which UPF. For example, UPF1 sends to UPF2 a first multicast message (e.g., a multicast advertisement) indicating IP chunks a, b, and x are present at UPF1, and UPF2 sends to UPF1 a second multicast message indicating IP chunks d, e, and x are present at UPF2. Each UPF determines whether there is an IP chunk conflict or irregularity, such as an overlap in IP chunks present at each UPF. i.e., duplicate IP chunks were assigned. To do this, each UPF compares the IP chunks indicated in the multicast message received from the peer against the IP chunks stored locally. In the example of FIG. 5, each UPF determines that IP chunk x is present at both UPFs. In other words, each UPF detects duplicate IP chunk x.

Upon determining/detecting duplicate IP chunk x, at 506, UPF1 sends to SMF 108 an N4 association update request having an IE that reports the duplicate chunk and that requests a resolution. Upon receiving the N4 association update (i.e., responsive to learning of the duplicate IP chunk configuration irregularity), at 508, SMF 108 determines a resolution for the duplicate IP chunk x, and sends to UPF1 an N4 association response to resolve the duplicate IP chunk conflict. For example, SMF 108 may retract IP chunk x from UPF1.

Upon determining duplicate IP chunk x, at 510, UPF2 sends to SMF 108 an N4 association update request having an IE that reports the duplicate IP chunk x and requests a resolution. Upon receiving the N4 association update, at 512, SMF 108 sends to UPF2 an N4 association response to resolve the duplicate IP chunk assignment. For example, SMF 108 may assert that IP chunk x may be used by UPF2 (due to the retraction of IP chunk x from UPF1).

Figure 6:
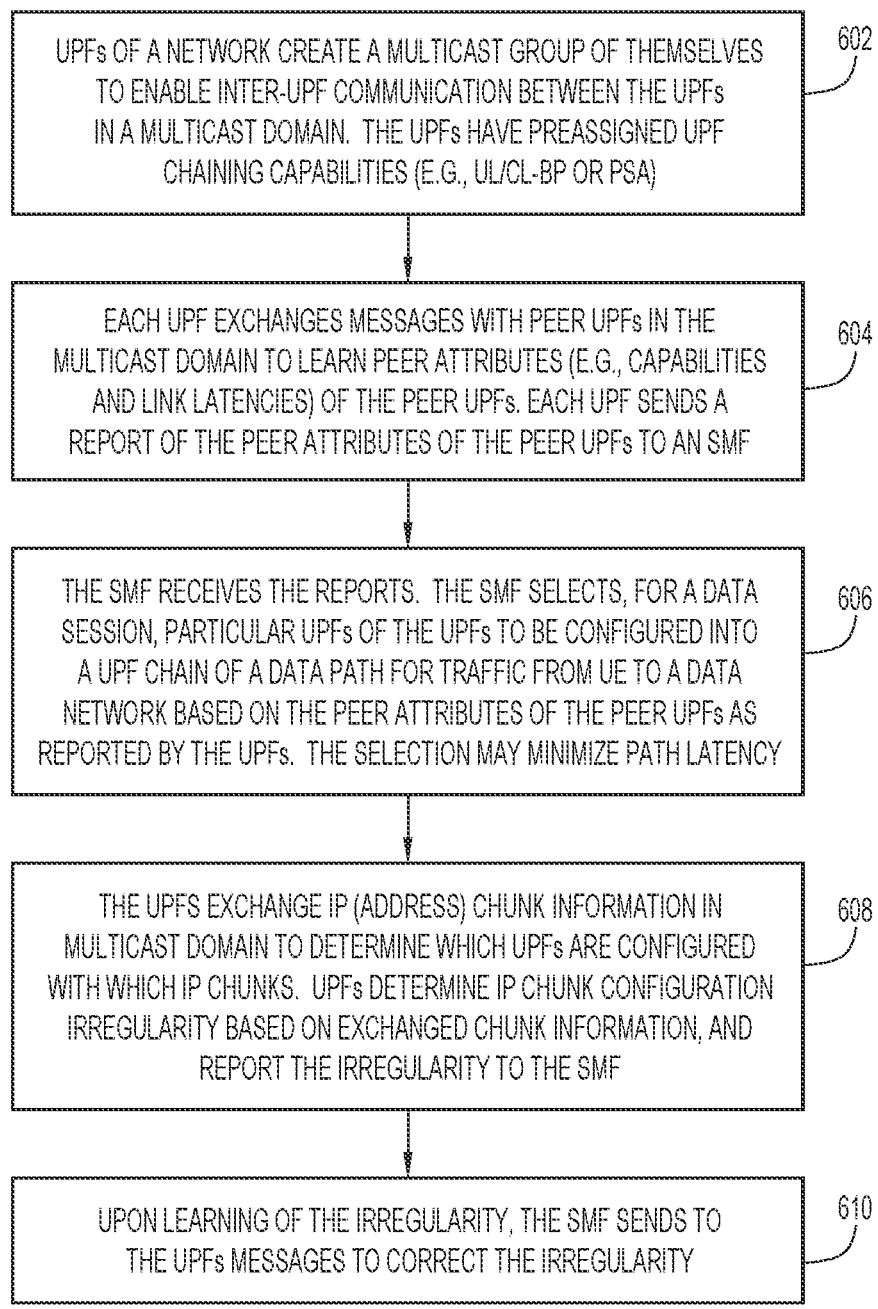
FIG. 6 is a flowchart of an example method performed in the network and by which the UPFs inter-communicate in the multicast domain and with a session management function (SMF) of the network to facilitate optimum UPF chain selection for a datapath, according to an example embodiment.

FIG. 6 is a flowchart of an example method 600 performed in network 102 and by which UPFs inter-communicate in a multicast domain and with an SMF to facilitate optimum UPF chain selection for a PDU session datapath.

At 602. The UPFs create/form a multicast group of the UPFs to enable inter-UPF communication between the UPFs in a multicast domain. The UPFs have preassigned UPF chaining capabilities, such that one or more first UPFs of the UPFs are each a UL/CL-BP UPF and one or more second UPFs are each a PSA UPF.

At 604, each UPF exchanges multicast messages with peer UPFs of the multicast group to learn peer attributes of the peer UPFs, and reports the peer attributes of the peer UPFs to the SMF. To do this, the UPFs exchange multicast advertisements that indicate the UPF chaining capabilities/roles preassigned to the UPFs, in order to learn the UPF chaining capabilities of the peer UPFs. Additionally, the UPFs exchange messages to learn/compute link latencies to each peer UPF. Each UPF sends to the SMF a report that indicates learned peer attributes for all peer UPFs (e.g., each UPF sends a peer attribute report containing P1, P2, and so on). The peer attributes include the UPF chaining capabilities of the peer UPFs, link latencies to the peer UPFs, and IP chunk information, for example.

At 606, the SMF selects, for a PDU session, particular UPFs of the UPFs to be configured into a UPF chain (e.g., for particular positions in the UPF chain) of a data path for traffic from user equipment to a data network, based on the peer attributes of the peer UPFs as reported by the UPFs. For example, the SMF selects the particular UPFs to include a UL/CL-BP UPF followed by a PSA UPF based on the UPF chaining capabilities reported by the UPFs. In one example, the SMF selects the particular UPFs based on the reported link latencies such that the data path has a minimum link latency. For example, the SMF selects the pair of UL/CL-BP and PSA UPFs that have a (reported) minimum latency between themselves compared to all other UL/CL-BP and PSA UPF pairs.

At 608, each UPF exchanges with the peer UPFs indications of which IP chunks were previously assigned to which UPFs by the SMF. Each UPF compares the indications of IP chunks received from the peer UPFs with locally stored IP chunks, i.e., each UPF compares its local IP chunk configuration to the peer IP chunk configurations. Each UPF determines whether the compare indicates any IP chunk configuration irregularity. When a UPF determines an IP chunk configuration irregularity, the UPF reports the IP chunk configuration irregularity to the SMF.

Upon learning of the IP chunk configuration irregularity, at 610, the SMF determines a resolution to the irregularity and sends to the UPFs messages that correct/resolve the irregularity.

In summary, embodiments presented herein create an IP multicast group of UPFs, and each participating UPF joins the multicast group. Once joined to the multicast group, participating UPFs become aware of each other as neighbors/peers (discover each other as peers) and inter-communicate with each other. The UPFs compute link latency between themselves. Each UPF provides to its peers (and vice versa) a critical set of attributes (e.g., UPF chaining role, IP chunk information, link status, and so on) in the form of a multicast announcement/advertisement. Each UPF that receives the multicast announcement creates a peer-UPF capability table and updates the parameters/attributes as and when each UPF receives such multicast announcements.

Armed with the aforementioned information, the UPFs assist the SMF with initial N4/N9 setup and UPF selection for UPF chaining.

The embodiments presented herein are described in the context of a 5G network by way of example, only. It is understood that the embodiments may be employed in other types of networks.

Figure 7:
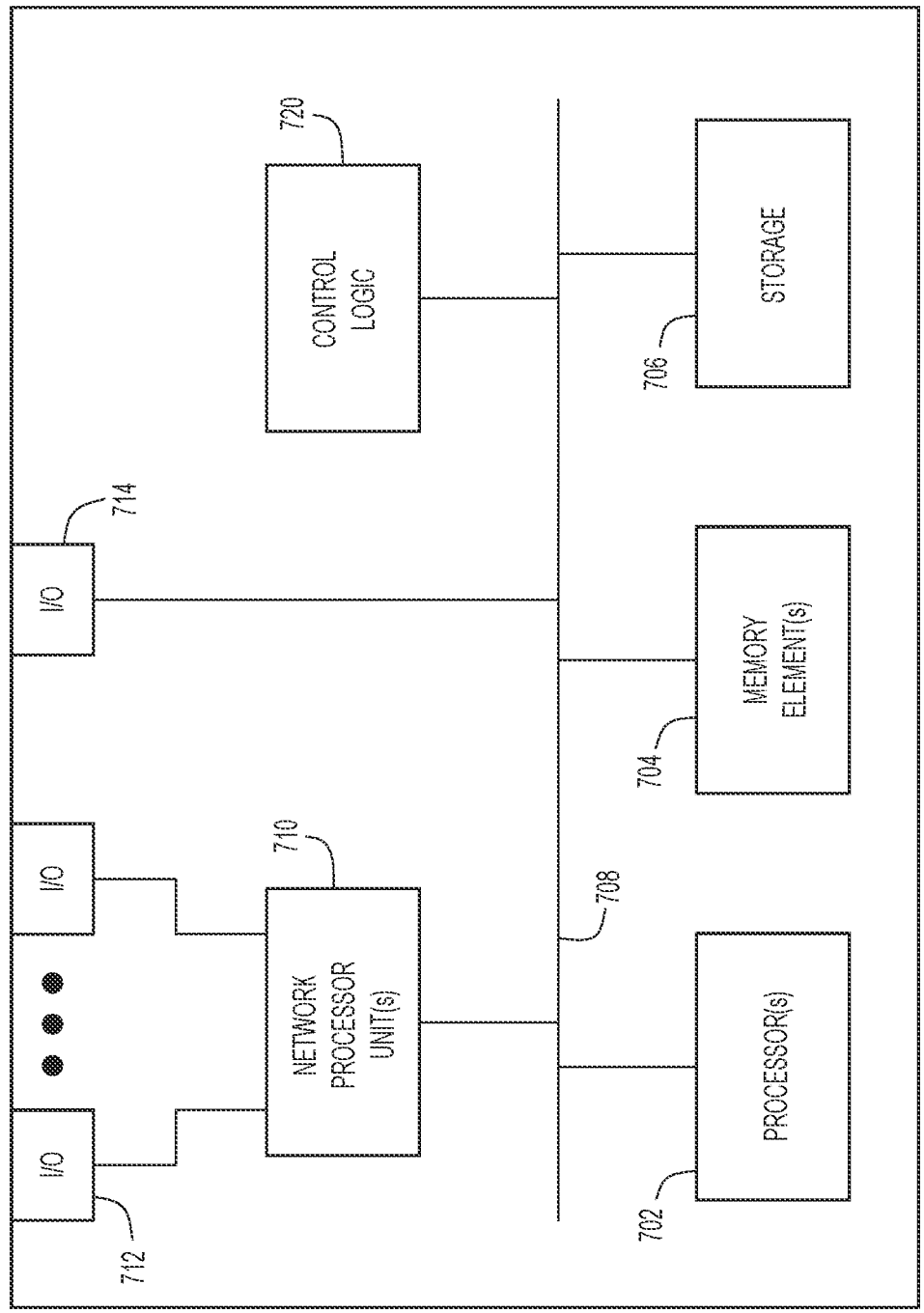
FIG. 7 illustrates a hardware block diagram of a computing device that may perform functions associated with operations discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any entity/entities as discussed for the techniques depicted in connection with FIGS. 1-6 in order to perform operations of the various techniques discussed herein. For example, computing device 700 may implement each of the network functions of network 102 and the user equipment.

In at least one embodiment, the computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include/be encoded with instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: at user plane functions (UPFs) of a network, creating a multicast group of the UPFs to enable inter-UPF communication between the UPFs in a multicast domain and, by each UPF: exchanging messages with peer UPFs of the UPFs in the multicast domain to learn peer attributes of the peer UPFs; reporting the peer attributes of the peer UPFs to a session management function (SMF) of the network; and at the SMF, selecting, for a data session, particular UPFs of the UPFs to be configured into a UPF chain of a data path for traffic from user equipment to a data network, based on the peer attributes of the peer UPFs as reported by the UPFs.

In some aspects, the techniques described herein relate to a method, wherein: exchanging includes exchanging UPF advertisements that indicate UPF chaining capabilities that are assigned to the UPFs, in order to learn the UPF chaining capabilities of the peer UPFs; and reporting includes reporting the peer attributes to include the UPF chaining capabilities learned by each UPF.

In some aspects, the techniques described herein relate to a method, wherein: the UPFs have been assigned UPF chaining capabilities such that the UPFs include uplink classifier (UL/CL) or branching point (BP) (UL/CL-BP) UPFs and protocol data unit (PDU) session anchor (PSA) UPFs; and selecting includes selecting as the particular UPFs a UL/CL-BP UPF and a PSA UPF based on the UPF chaining capabilities reported by the UPFs.

In some aspects, the techniques described herein relate to a method, wherein: exchanging includes exchanging UPF messages to learn link latencies to each peer UPF; and reporting includes reporting, to the SMF, the link latencies to each peer UPF.

In some aspects, the techniques described herein relate to a method, wherein: selecting includes selecting the particular UPFs for the UPF chain based on the link latencies such that the data path has a minimum latency.

In some aspects, the techniques described herein relate to a method, further including, by each UPF: sending a multicast join to the multicast group of the UPFs to join the multicast group of the UPFs.

In some aspects, the techniques described herein relate to a method, wherein each UPF is configured with chunks of Internet Protocol (IP) addresses, and wherein: exchanging includes exchanging indications of which of the chunks have been assigned to which of the UPFs; and the method further includes, by each UPF, upon determining a chunk configuration irregularity based on the indications, reporting the chunk configuration irregularity to the SMF.

In some aspects, the techniques described herein relate to a method, further including, at the SMF: responsive to learning of the chunk configuration irregularity, sending, to the UPFs, messages to resolve the chunk configuration irregularity.

In some aspects, the techniques described herein relate to a method, wherein the network is a 5G network.

In some aspects, the techniques described herein relate to a system including: a session management function (SMF) and user plane functions (UPFs) of a network, wherein the UPFs are configured to create a multicast group of the UPFs to enable inter-UPF communication between the UPFs in a multicast domain, each UPF configured to perform: exchanging messages with peer UPFs of the UPFs in the multicast domain to learn peer attributes of the peer UPFs; and reporting the peer attributes of the peer UPFs to the SMF; wherein the SMF is configured to perform, selecting, for a data session, particular UPFs of the UPFs to be configured into a UPF chain of a data path for traffic from user equipment to a data network, based on the peer attributes of the peer UPFs as reported by the UPFs.

In some aspects, the techniques described herein relate to a system, wherein each UPF is configured to perform: exchanging by exchanging UPF advertisements that indicate UPF chaining capabilities assigned to the UPFs, to learn the UPF chaining capabilities of the peer UPFs; and reporting by reporting the peer attributes to include the UPF chaining capabilities.

In some aspects, the techniques described herein relate to a system, wherein: the UPFs have assigned capabilities such that the UPFs include uplink classifier (UL/CL) or branching point (BP) (UL/CL-BP) UPFs and protocol data unit (PDU) session anchor (PSA) UPFs; and the SMF is configured to perform selecting by selecting as the particular UPFs a UL/CL-BP UPF and a PSA UPF based on the UPF chaining capabilities reported by the UPFs.

In some aspects, the techniques described herein relate to a system, wherein each UPF is configured to perform: exchanging by exchanging UPF messages to learn link latencies to each peer UPF; and reporting by reporting, to the SMF, the link latencies to each peer UPF.

In some aspects, the techniques described herein relate to a system, wherein the SMF is configured to perform: selecting by selecting the particular UPFs for the UPF chain based on the link latencies such that the data path has a minimum latency.

In some aspects, the techniques described herein relate to a system, wherein each UPF is configured with chunks of Internet Protocol (IP) addresses, and wherein: each UPF is configured to perform exchanging by exchanging indications of which of the chunks have been assigned to which of the UPFs; and each UPF is further configured to perform, upon determining a chunk configuration irregularity based on the indications, reporting the chunk configuration irregularity to the SMF.

In some aspects, the techniques described herein relate to a system, wherein the SMF is further configured to perform: responsive to learning of the chunk configuration irregularity, sending, to the UPFs, messages to resolve the chunk configuration irregularity.

In some aspects, the techniques described herein relate to a system, wherein the network is a 5G network.

In some aspects, the techniques described herein relate to non-transitory computer readable media encoded with instructions that, when executed by one or more processors of user plane functions (UPFs) and a session management function (SMF) of a network: at the UPFs, creating a multicast group of the UPFs to enable inter-UPF communication between the UPFs in a multicast domain and, by each UPF: exchanging messages with peer UPFs of the UPFs in the multicast domain to learn peer attributes of the peer UPFs; reporting the peer attributes of the peer UPFs to the SMF; and at the SMF, selecting, for a data session, particular UPFs of the UPFs to be configured into a UPF chain of a data path for traffic from user equipment to a data network, based on the peer attributes of the peer UPFs as reported by the UPFs.

In some aspects, the techniques described herein relate to a non-transitory computer readable media, wherein: the instructions to cause the one or more processors to perform exchanging include instructions to cause the one or more processors to perform exchanging UPF advertisements that indicate UPF chaining capabilities that are assigned to the UPFs, in order to learn the UPF chaining capabilities of the peer UPFs; and the instructions to cause the one or more processors to perform reporting include instructions to cause the one or more processors to perform reporting the peer attributes to include the UPF chaining capabilities learned by each UPF.

In some aspects, the techniques described herein relate to a non-transitory computer readable media, wherein: the UPFs have been assigned UPF chaining capabilities such that the UPFs include uplink classifier (UL/CL) or branching point (BP) (UL/CL-BP) UPFs and protocol data unit (PDU) session anchor (PSA) UPFs; and the instructions to cause the one or more processors to perform selecting include instructions to cause the one or more processors to perform selecting as the particular UPFs a UL/CL-BP UPF and a PSA UPF based on the UPF chaining capabilities reported by the UPFs.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    at user plane functions (UPFs) of a network, creating a multicast group of the UPFs to enable inter-UPF communication between the UPFs in a multicast domain and, by each UPF:
        exchanging messages with peer UPFs of the UPFs in the multicast domain to learn peer attributes of the peer UPFs; and
        reporting the peer attributes of the peer UPFs to a session management function (SMF) of the network; and
    at the SMF, selecting, for a data session, particular UPFs of the UPFs to be configured into a UPF chain of a data path for traffic from user equipment to a data network, based on the peer attributes of the peer UPFs as reported by the UPFs.

2. The method of claim 1, wherein:
    exchanging includes exchanging UPF advertisements that indicate UPF chaining capabilities that are assigned to the UPFs, in order to learn the UPF chaining capabilities of the peer UPFs; and
    reporting includes reporting the peer attributes to include the UPF chaining capabilities learned by each UPF.

3. The method of claim 1, wherein:
    the UPFs are assigned UPF chaining capabilities such that the UPFs include uplink classifier (UL/CL) or branching point (BP) (UL/CL-BP) UPFs and protocol data unit (PDU) session anchor (PSA) UPFs; and
    selecting includes selecting as the particular UPFs a UL/CL-BP UPF and a PSA UPF based on the UPF chaining capabilities reported by the UPFs.

4. The method of claim 1, wherein:
    exchanging includes exchanging UPF messages to learn link latencies to each peer UPF; and
    reporting includes reporting, to the SMF, the link latencies to each peer UPF.

5. The method of claim 4, wherein:
selecting includes selecting the particular UPFs for the UPF chain based on the link latencies such that the data path has a minimum latency.

6. The method of claim 4, further comprising, by each UPF:
sending a multicast join to the multicast group of the UPFs to join the multicast group of the UPFs.

7. The method of claim 1, wherein each UPF is configured with chunks of Internet Protocol (IP) addresses, and wherein:
exchanging includes exchanging indications of which of the chunks are assigned to which of the UPFs; and
the method further comprises, by each UPF, upon determining a chunk configuration irregularity based on the indications, reporting the chunk configuration irregularity to the SMF.

8. The method of claim 7, further comprising, at the SMF:
responsive to learning of the chunk configuration irregularity, sending, to the UPFs, messages to resolve the chunk configuration irregularity.

9. The method of claim 7, wherein the network is a 5G network.

10. A system comprising:
memory; and
one or more processors coupled to the memory and configured to implement a session management function (SMF) and user plane functions (UPFs) of a network, wherein the UPFs are configured to create a multicast group of the UPFs to enable inter-UPF communication between the UPFs in a multicast domain, each UPF configured to perform:
exchanging messages with peer UPFs of the UPFs in the multicast domain to learn peer attributes of the peer UPFs; and
reporting the peer attributes of the peer UPFs to the SMF;
wherein the SMF is configured to perform, selecting, for a data session, particular UPFs of the UPFs to be configured into a UPF chain of a data path for traffic from user equipment to a data network, based on the peer attributes of the peer UPFs as reported by the UPFs.

11. The system of claim 10, wherein each UPF is configured to perform:
exchanging by exchanging UPF advertisements that indicate UPF chaining capabilities assigned to the UPFs, to learn the UPF chaining capabilities of the peer UPFs; and
reporting by reporting the peer attributes to include the UPF chaining capabilities.

12. The system of claim 11, wherein:
the UPFs have assigned capabilities such that the UPFs include uplink classifier (UL/CL) or branching point (BP) (UL/CL-BP) UPFs and protocol data unit (PDU) session anchor (PSA) UPFs; and
the SMF is configured to perform selecting by selecting as the particular UPFs a UL/CL-BP UPF and a PSA UPF based on the UPF chaining capabilities reported by the UPFs.

13. The system of claim 10, wherein each UPF is configured to perform:
exchanging by exchanging UPF messages to learn link latencies to each peer UPF; and
reporting by reporting, to the SMF, the link latencies to each peer UPF.

14. The system of claim 13, wherein the SMF is configured to perform:
selecting by selecting the particular UPFs for the UPF chain based on the link latencies such that the data path has a minimum latency.

15. The system of claim 10, wherein each UPF is configured with chunks of Internet Protocol (IP) addresses, and wherein:
each UPF is configured to perform exchanging by exchanging indications of which of the chunks are assigned to which of the UPFs; and
each UPF is further configured to perform, upon determining a chunk configuration irregularity based on the indications, reporting the chunk configuration irregularity to the SMF.

16. The system of claim 15, wherein the SMF is further configured to perform:
responsive to learning of the chunk configuration irregularity, sending, to the UPFs, messages to resolve the chunk configuration irregularity.

17. The system of claim 10, wherein the network is a 5G network.

18. Non-transitory computer readable media encoded with instructions that, when executed by one or more processors of user plane functions (UPFs) and a session management function (SMF) of a network:
at the UPFs, creating a multicast group of the UPFs to enable inter-UPF communication between the UPFs in a multicast domain and, by each UPF:
exchanging messages with peer UPFs of the UPFs in the multicast domain to learn peer attributes of the peer UPFs; and
reporting the peer attributes of the peer UPFs to the SMF; and
at the SMF, selecting, for a data session, particular UPFs of the UPFs to be configured into a UPF chain of a data path for traffic from user equipment to a data network, based on the peer attributes of the peer UPFs as reported by the UPFs.

19. The non-transitory computer readable media of claim 18, wherein:
the instructions to cause the one or more processors to perform exchanging include instructions to cause the one or more processors to perform exchanging UPF advertisements that indicate UPF chaining capabilities that are assigned to the UPFs, in order to learn the UPF chaining capabilities of the peer UPFs; and
the instructions to cause the one or more processors to perform reporting include instructions to cause the one or more processors to perform reporting the peer attributes to include the UPF chaining capabilities learned by each UPF.

20. The non-transitory computer readable media of claim 18, wherein:
the UPFs are assigned UPF chaining capabilities such that the UPFs include uplink classifier (UL/CL) or branching point (BP) (UL/CL-BP) UPFs and protocol data unit (PDU) session anchor (PSA) UPFs; and
the instructions to cause the one or more processors to perform selecting include instructions to cause the one or more processors to perform selecting as the particular UPFs a UL/CL-BP UPF and a PSA UPF based on the UPF chaining capabilities reported by the UPFs.

* * * * *